United States Patent [19]
Morita

[11] 3,898,804
[45] Aug. 12, 1975

[54] STRUCTURE OF AN EXHAUST MANIFOLD OF A ROTARY ENGINE

[75] Inventor: Minoru Morita, Nagoyo, Japan

[73] Assignee: Toyota Jidosha Kogyo Kabushiki Kaisha, Toyota, Japan

[22] Filed: Apr. 30, 1974

[21] Appl. No.: 465,485

[30] Foreign Application Priority Data
Jan. 16, 1974 Japan.................................. 49-7642

[52] U.S. Cl. ....................... 60/323; 60/313; 60/901; 123/8.07; 123/8.45
[51] Int. Cl. .............................................. F01n 3/08
[58] Field of Search ....... 123/8.45, 8.05, 8.07, 8.01; 60/901, 313, 323

[56] References Cited
UNITED STATES PATENTS

| | | | |
|---|---|---|---|
| 1,868,355 | 7/1932 | Goldberg | 60/323 |
| 3,703,083 | 11/1972 | Tadokoro | 60/323 |
| 3,722,493 | 3/1973 | Hartmann | 123/8.07 |
| 3,756,027 | 9/1973 | Gotoh | 60/323 |

*Primary Examiner*—Clarence R. Gordon
*Attorney, Agent, or Firm*—Stewart and Kolasch, Ltd.

[57] ABSTRACT

A structure of an exhaust manifold of a multi-rotor type rotary engine, wherein individual exhaust ports corresponding to individual combustion chambers are connected to a common manifold reactor in the manner that the lines of ejection of the individual exhaust ports cut one another at a point located within a space confined in the manifold reactor.

7 Claims, 11 Drawing Figures

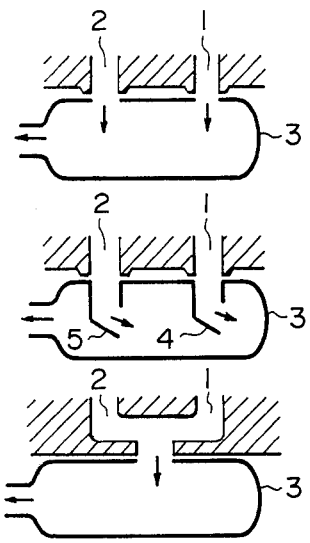
FIG. 1a PRIOR ART
FIG. 1b PRIOR ART
FIG. 1c PRIOR ART
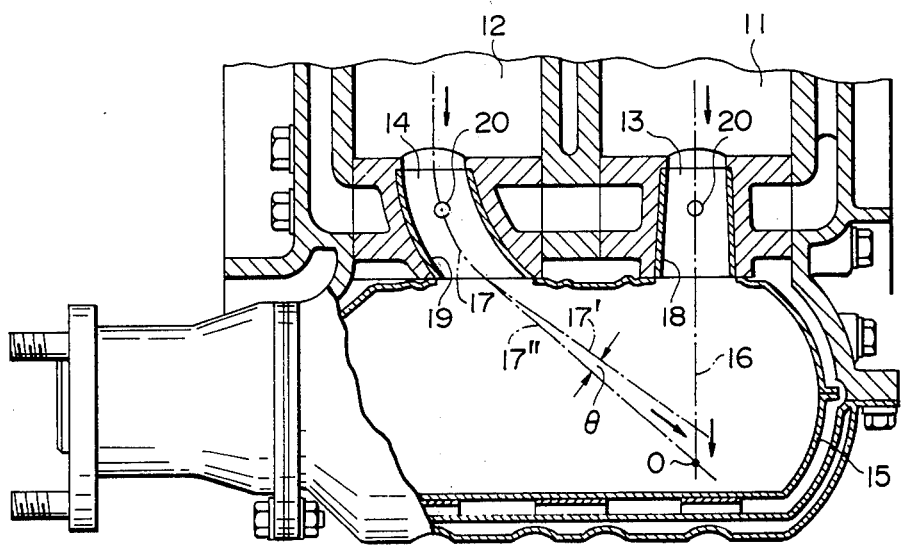
FIG. 2

EXHAUST PORT OPENS     EXHAUST PORT CLOSES

STRUCTURE OF AN EXHAUST MANIFOLD OF A ROTARY ENGINE

BACKGROUND OF THE INVENTION

1. Field of the Invention

This invention relates generally to a rotary engine, and more particularly, a structure of an exhaust manifold of a multi-rotor type rotary engine which comprises a plurality of rotors, wherein the exhaust gases delivered from individual combustion chambers corresponding to individual rotors are introduced into a common manifold reactor.

2. Description of the Prior Art

Conventionally, as the structure of the exhaust manifold of the aforementioned type, there are known those structures as shown in FIG. 1a, b, c. Among these, FIG. 1a shows a basic structure in the case of a two rotor type rotary engine, wherein exhaust ports 1 and 2 which lead exhaust gases from the combustion chambers corresponding to first and second rotors are both arranged substantially perpendicular to the axis of the rotors and connected to a common manifold reactor 3. With regard to this basic structure of the exhaust manifold, there are problems that the staying time in the manifold reactor of the exhaust gases introduced from the exhaust port 2 is short, agitation of the exhaust gases through the whole region in the reactor is low, and accordingly, the effect of recombustion by the manifold reactor is not satisfactorily attained. As a countermeasure to these problems, a structure of the exhaust manifold having guide means which include deflecting plates 4 and 5 arranged at the exit of the exhaust ports as shown in FIG. 1b has been proposed. Although these gas guide means improve the performance of the manifold reactor with regard to the staying time and agitation of the exhaust gases in the reactor, these gas guide means act, however, as a kind of heat absorbing fin which lowers the temperature of the exhaust gases, whereby other problems such as deterioration of the recombustion effect by the manifold reactor and especially poor exhaust gas purification at the cold starting of the engine are brought about.

As an alternative structure of the exhaust manifold, it has also been proposed to join the exhaust ports of the two combustion chambers within the rotor housing as shown in FIG. 1c so that the flows of the exhaust gases delivered from the two combustion chambers are first joined and thereafter introduced into the manifold reactor. In this structure, the problem that the staying time in the reactor of the exhaust gases delivered from different combustion chambers are different from each other is solved. However, this structure is bound with a problem that a part of the exhaust port located within the rotor housing becomes inevitably long, whereby a high cooling rate is caused of the exhaust gases while they are flowing through the exhaust port, thus causing a lower exhaust gas temperature in the reactor and deterioration of the recombustion effect of the reactor especially when the engine is in a cold condition.

SUMMARY OF THE INVENTION

Therefore, it is the object of this invention to counteract the aforementioned problems regarding the conventional structure of the exhaust manifold of a multirotor type rotary engine and to provide an improved structure of the exhaust manifold which can satisfy those conditions which are necessary for obtaining a high performance of the manifold reactor, i.e. to keep the temperature of the exhaust gases introduced into the exhaust manifold as high as possible, to keep the staying time in the reactor of individual exhaust gases delivered from individual combustion chambers at a common and required time, and to effect good agitation of the exhaust gases in the reactor.

According to this invention, the abovementioned object is accomplished by a structure of an exhaust manifold of a multi-rotor type rotary engine which comprises a plurality of rotors, wherein the exhaust gases delivered from individual combustion chambers corresponding to individual rotors are introduced into a common manifold reactor, characterised in that the lines of ejection of individual exhaust ports corresponding to said individual combustion chambers substantially cut one another at a point located within an internal space of the manifold reactor.

According to the aforementioned constitution of this invention, all exhaust gases delivered from the individual combustion chambers can be led to any favourable position within the space confined by the manifold reactor without providing any gas guide means such as delfecting plates at the exit of the exhaust ports, whereby the exhaust gases delivered from the individual combustion chambers can be given a common and predetermined favourable staying time without being caused any substantial lowering of their temperature. Furthermore, since the exhaust gases delivered from the individual combustion chambers are joined with each other at a point located within the manifold reactor in the manner of being mixed with each other and agitated, it is accomplished that high temperature exhaust gases delivered from a combustion chamber at an early stage of an exhaust stroke are mixed with exhaust gases containing a relatively large amount of combustible gases delivered from another combustion chamber at an end stage of another exhaust stroke due to a displacement of operation between the two combustion chambers, whereby good recombustion of the combustible gases is effected.

The aforementioned point located in the space confined by the manifold reactor where the lines of ejection of individual exhaust ports which lead the exhaust gases from individual combustion chambers should preferably be positioned in the depth of the internal space of the reactor sufficiently distant from the exit of the manifold reactor. For this purpose, according to a particular feature of this invention, the axis of the exhaust port which opens at the exit side of the manifold reactor should preferably be bent toward the depth of the reactor internal space. Alternatively, according to another particular feature of this invention, the axis of the exhaust port which opens at the exit side of the manifold reactor may be straightly inclined toward the depth of the reactor internal space. Furthermore, in the structure of the exhaust manifold according to this invention, since each exhaust port is directly led from the combustion chamber to the manifold reactor independently and without accompanying auxiliary means such as gas guiding fins, etc. its configurational constitution may be very simple. In this connection, therefore, according to still another particular feature of this invention, a peripheral wall portion of the exhaust port may preferably be adapted as thermally insulated from the rotor housing surrounding the peripheral wall portion. This heat insulating structure is easily obtained by inserting a tubular member into a corresponding opening formed in the rotor housing, said tubular member being made of a heat insulating material and adapted to define the peripheral wall portion of the exhaust port. Alternatively, a tubular member which is made of a heat insulating or heat conducting material maybe mounted in a corresponding opening formed in the rotor housing as spaced from the wall surface of said opening.

BRIEF DESCRIPTION OF THE DRAWING

In the accompanying drawing,

FIGS. 1a, b, c are schemmatical views showing several conventional structures of the exhaust manifold;

FIG. 2 is a sectional view showing an embodiment of the structure of the exhaust manifold according to this invention;

DESCRIPTION OF THE PREFERRED EMBODIMENTS

Figure 3A:
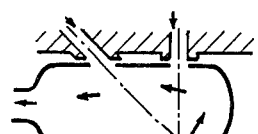
FIGS. 3a–d are schemmatical views showing several modifications of the structure of the exhaust manifold according to this invention.
Figure 3B:
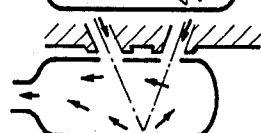
Figure 3C:
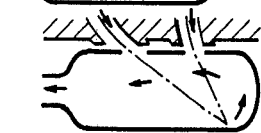

In the following, this invention will be described in more detail of some preferred embodiments with reference to the accompanying drawing, particularly FIGS. 2–6.

Referring to FIG. 2 which shows a preferred embodiment of the structure of the exhaust manifold according to this invention in an axial section, the engine is constituted as a two-rotor type rotary piston engine having a front side combustion chamber 11 and a rear side combustion chamber 12. The exhaust gases delivered from the front side combustion chamber 11 and the rear side combustion chamber 12 are both introduced into a common manifold reactor 15 through a front side exhaust port 13 and a rear side exhaust port 14, respectively. In this embodiment, the front side exhaust port 13 is arranged to have its axis 16 which extends at right angle with respect to the rotor axis (not shown), while by contrast therewith, the rear side exhaust port 14 is arranged to have its axis 17 curved toward the depth of the manifold reactor 15. In this case, the line of ejection of the front side exhaust port 13 which means the central axis of the exhaust gas flow ejected from the front side exhaust port coincides substantially with the axis 16 of the exhaust port 13, while the line of ejection of the rear side exhaust port 14 which means the center line of the exhaust gas flow ejected from the rear side exhaust port is a line 17" which is deflected from a line 17' by an angle θ which is determined according to a flow characteristic of the exhaust gases, said line 17' being a tangential extension of the curved axis 17 of the exhaust port 14. These two lines of ejection 16 and 17" of the two exhaust ports 13 and 14 cut each other at a point 0 located within the space confined in the manifold reactor 15.

Figure 3D:
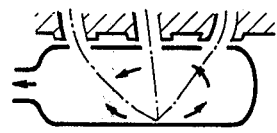

FIGS. 3a, b, c show schematically several embodiments of applying the structure of the exhaust manifold according to this invention to a two-rotor type rotary engine other than that shown in FIG. 2, and FIG. 3d shows another embodiment of applying this invention to a three-rotor type rotary engine.

Figure 4:
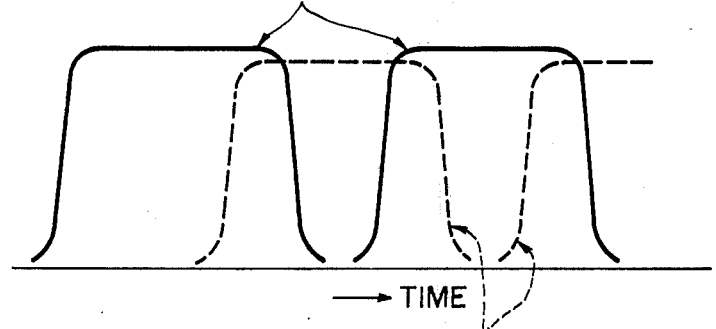
FIG. 4 is a diagram showing the gas mixing effect obtained by the structure of the exhaust manifold according to this invention.

FIG. 4 shows a process in which the exhaust gases delivered from two different combustion chambers are collided and mixed with each other when this invention has been applied to a two-rotor type rotary engine, wherein high temperature exhaust gases delivered at an early stage of an exhaust stroke are mixed with exxhaust gases delivered at an end stage of another exhaust stroke and containing combustible gases thereby to effect good recombustion of the combustible gases. In this manner, the combustible gases exhausted from a combustion chamber at an end stage of an exhaust stroke are always heated by the high temperature combustion gases delivered from another combustion chamber, and according to the repetition of the aforementioned interaction between the two kinds of exhaust gases a high recombustion efficiency is attained.

Figure 5:
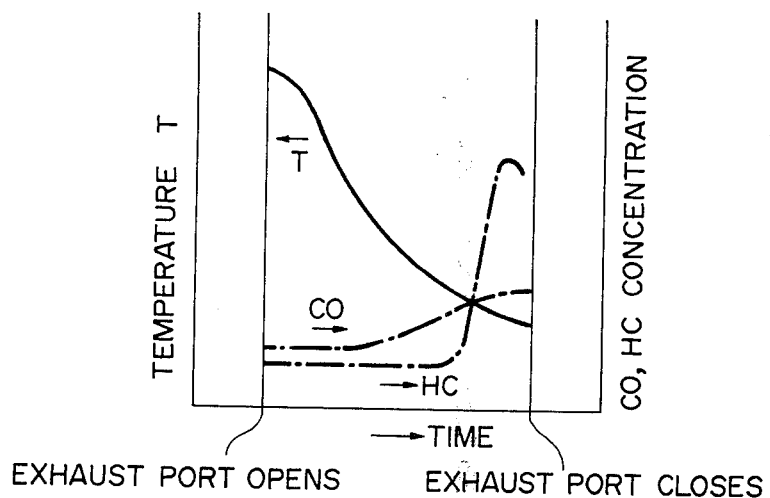
FIG. 5 is a diagram showing a performance of exhaust gases.

FIG. 5 shows a change in the content of the exhaust gases during the period between opening and closing of the exhaust port for a reference purpose.

Coming back to FIG. 2, it will be appreciated that the exhaust ports 13 and 14 in the manifold structure according to this invention are both of a simple channel space. Therefore, it is easy to form the peripheral portions of these exhaust ports by heat insulating layers such as shown by 18 and 19. By forming the peripheral wall portion of the exhaust port as a heat insulating layer, the holding of the exhaust gas temperature while they flow through the exhaust port is improved making it possible to keep a high exhaust gas temperature in the reactor and to accomplish good recombustion by the reactor. The heat insulating layer 18 and 19 may be formed as a sleeve made of the heat insulating material, said sleeve being adapted to be mounted into a corresponding opening formed in the rotor housing.

Reference numeral 20 in FIG. 2 designates an opening for ejecting secondary air into the exhaust gases for the purpose of accomplishing perfect combustion of the combustible gases contained in the exhaust gases in the manifold reactor. The amount of the secondary air should preferably be controlled according to operational conditions of the engine so that the air may be reduced or cut when an automobile carrying the engine is running at a high speed or high load or deccelerating.

Figure 6:
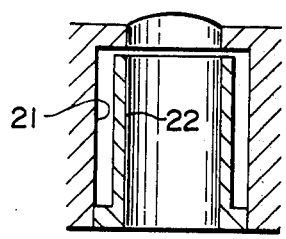
FIG. 6 is a sectional view showing an embodiment of the heat insulating structure of the exhaust port.

FIG. 6 shows another embodiment of the heat insulating structure at the peripheral wall portion of the exhaust port. In this case, the rotor housing is formed with an opening 21 corresponding to an exhaust port and a tubular member 22 formed to leave an annular space therearound in the opening 21 is mounted in said opening. The exhaust port is defined by the inner wall surface of the tubular member. The exhaust port structure of this kind wherein a tubular member is mounted in a corresponding opening formed in the rotor housing is possible because the exhaust port in the structure of the exhaust manifold according to this invention can be of a simple tubular structure.

I claim:

1. A structure of an exhaust manifold of a multi-rotor type rotary engine which comprises a plurality of rotors, wherein exhaust gases delivered from individual combustion chambers corresponding to individual rotors are introduced into a common manifold reactor, characterized in that the lines of ejection of individual exhaust ports corresponding to said individual combustion chambers substantially cut one another at a point located within an internal space of the manifold reactor, 2. A structure of an exhaust manifold according to claim 1, wherein said point is located in the depth of the manifold reactor sufficiently distant from the exit thereof.

3. A structure of an exhaust manifold according to claim 1, wherein the axis of an exhaust port which opens into the manifold reactor at a portion relatively close to the exit of the reactor is curved toward the depth of the manifold reactor.

4. A structure of an exhaust manifold according to claim 1, wherein the axis of an exhaust port which opens into the manifold reactor at a portion located relatively close to the exit of the reactor is straightly inclined toward the depth of the manifold reactor.

5. A structure of an exhaust manifold according to claim 1, wherein the peripheral portion of said exhaust port is thermally insulated from a motor housing surrounding said wall portion.

6. A structure of an exhaust manifold according to claim 5, wherein said peripheral wall portion of the exhaust port is formed of a tubular member made of a heat insulating material.

7. A structure of an exhaust manifold according to claim 5, wherein the peripheral wall portion of the exhaust port is formed of a tubular member which is mounted into a corresponding opening formed in a rotor housing in a manner to leave an annular space around said tubular member.

* * * * *